Nov. 15, 1938.  R. MABILLE  2,137,172
ROTARY ENGINE
Filed Dec. 21, 1936

Inventor:
Raoul Mabille
By C. F. Woodward
Atty

Patented Nov. 15, 1938

2,137,172

UNITED STATES PATENT OFFICE 2,137,172

ROTARY ENGINE

Raoul Mabille, Brussels, Belgium

Application December 21, 1936, Serial No. 117,075
In Belgium January 3, 1936

6 Claims. (Cl. 103—144)

The present invention relates to rotary engines, which may be power machines (as fluid pressure engines, combustion engines and the like) or driven machines (as compressors, pumps and the like), of the type comprising in a cylindrical casing an eccentric rotor having blades which are mounted radially on a shaft concentric to the stator and extend through the rotor wall, being slidable in cylindrical bearings adapted to oscillate in said wall.

In known engines of this type, the axial longitudinal plane of each blade extends radially through the stator axis. During a revolution of the rotor, the angle comprised between the axial plane of a blade and the radial plane extending through the rotor axis constantly varies, there being symmetrical variations in the two halves of the stator on each side of its plane of symmetry. The amplitude of the rocking motion of the cylindrical bearings in the rotor wall vary symmetrically, as a function of such angle. But the efforts to which the blades are subjected do not vary with such symmetry. During the suction period, the stresses developed at the contact of the blades and cylindrical bearings are practically reduced to those due to friction and inertia. During the pressure period, on the contrary, the stresses may be very considerable. This lack of symmetry, in the course of a revolution, is liable to give rise to difficult or defective operation. Similar phenomena occur in the case of power engines.

It is the object of my present invention to avoid, or at least substantially to reduce this inconvenience, and to provide an unsymmetrical structure that will allow of reducing the rocking motion of the cylindrical bearings in the zone where the blades are subjected to high stresses and to increase such motion in the zone where stresses are comparatively low.

With this object in view, in accordance with my invention, I so form and arrange the blades that instead of extending through the axis of the stator, the axial longitudinal planes of the blades always extend tangentially to a cylinder coaxial with the stator. Preferably the radius of said cylinder is chosen smaller than the distance between the respective axes of the stator and rotor.

Other features and advantages of my invention will be apparent from the following description, taken in connection with the accompanying drawing which illustrates, by way of example, an embodiment of my said invention.

Referring to the drawing,

Fig. 1 diagrammatically illustrates an engine of the type referred to.

Fig. 3 diagrammatically illustrates an engine constructed in accordance with my invention.

Figure 1:
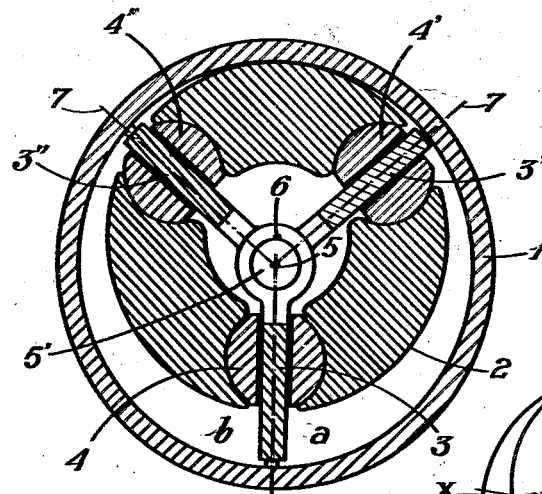
Figure 3:
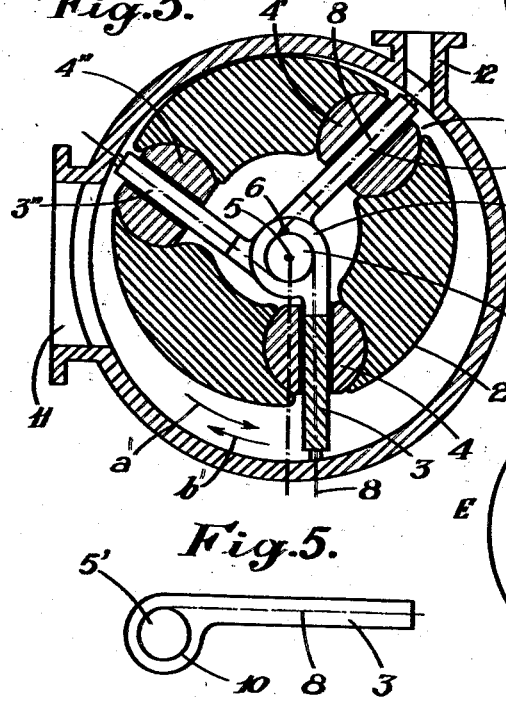

The engines shown in Figs. 1 and 3 comprise each a stator 1, an eccentrically mounted rotor 2, and blades 3, 3', 3'' which are mounted on a shaft 5' coaxial with the stator and extend through the wall of rotor 2, being slidable in cylindrical bearings 4, 4', 4'' respectively, which are rotatably fitted in recesses in the rotor wall. The position of the rotor axis is shown at 6.

In the known engine illustrated in Fig. 1, the axial longitudinal plane 7 of each blade extends through the stator axis 5. Now in the case of a compressor, for example, let us suppose that chamber $a$ operates as a suction chamber and chamber $b$ as a pressure chamber. During a revolution of the rotor, the bearings 4, 4', 4'' will rock in the recesses in rotor 2 in order to follow the varying inclination of the blades. By considering the variation of the angle between the plane 7 and the radial plane extending through the rotor axis 6, it is possible to realize the magnitude of these oscillations and their variation in the course of a revolution. In the case of Fig. 1, the said angle is nil in the position occupied by blade 3 and it also would be nil in the diametrically opposed position, as in these positions both planes coincide with each other.

Figure 2:
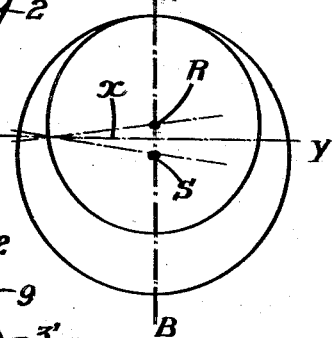
Figs. 2 and 4 are explanatory diagrams relating to the engine shown in Fig. 1 and to the engine shown in Fig. 3 respectively.

Referring to Fig. 2 it is seen that the said angle ($x$) is largest at points X and Y, and when RXS or RYS is an isosceles triangle, R and S being projections of the rotor axis and stator axis respectively. In such a machine the oscillations of the cylindrical bearings will therefore vary in the same manner during the half revolution AYB and during the half revolution AXB. In the case of a compressor, however, the stresses will not vary likewise; they will be very much higher in the arc which corresponds to the compression phase.

In my improved structure, as shown in Fig. 3, this inconvenience is avoided. The blades 3, 3' and 3'' are offset, i. e. their respective axial planes 8 extend no longer through the stator axis 5 but tangentially to an imaginary cylinder 10 coaxial with the stator.

Preferably, as shown, the radius of this cylinder 10 is smaller than the distance between the stator axis 5 and the rotor axis 6.

Figure 4:
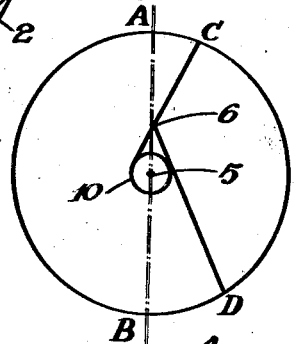

Referring to Fig. 4, it will be seen that the points where the axial planes 8 of the blades coincide with planes extending through the rotor axis, are no longer points A and B, but points C and D which are defined respectively by drawing from point 6 two tangents to the circle 10. When considering the variation of the angle between said two planes, it is seen that as compared with the variation in the engine shown in Fig. 1, the oscillations of the bearings in the rotor wall are reduced during the travel through arc ACDB and are increased during the travel through arc AEB.

It has been found that the best results are obtained when the offsetting of the blades, i. e. the radius of circle 10, is equal to one half the distance between axes 6 and 5. In this case the maximum value of said angle during the travel through arc ACDB is equal to about one half the corresponding angle in a machine such as shown in Fig. 1, in which the blades are not offset.

It will be understood that by so constructing the engine and so determining its direction of rotation that the arc ACDB corresponds to the working zone, i. e. the zone in which the highest stresses are developed, I am able to overcome the aforesaid difficulties and the drawbacks of previous machines. This zone would be the compression zone in the case of a compressor and the expansion zone in the case of a power engine, say an air pressure motor.

Thus in the engine shown in Fig. 3, which corresponds to the diagram in Fig. 4, the working zone comprises the right hand portion of the stator. I have shown at 11 and 12 ports which may be used either as inlet ports or as outlet ports. If the engine operates as a compressor, I use 11 as an inlet port and 12 as an outlet port; the rotor then revolves in the direction of arrow a' and the oscillations of bearings 4, 4', 4'' will be smallest in the region corresponding to the compression zone. If the engine is operated as, say, a fluid pressure engine, 12 is used as an inlet port and 11 as an outlet port, the rotor revolves in the direction of arrow b', and the region where the oscillations of bearings 4, 4', 4'' are smallest will be the expansion or power zone.

Figure 5:
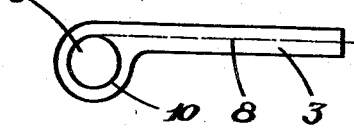
Fig. 5 illustrates on a large scale a blade of the engine shown in Fig. 3.

Fig. 5 shows on a larger scale an end view of a blade according to my invention.

Owing to the offsetting of the blades, the oscillation of the bearings is not of equal magnitude on both sides of the radial planes passing through the rotor axis and through the centre of the bearings. For this reason as shown in Fig. 3, the gaps 9 in the periphery of the rotor through which the blades extend, must be unsymmetrical with respect to said planes. This makes it possible to reduce the size of said gaps and to avoid the bearings becoming jammed therein under the action of centrifugal force.

It will be understood that the invention may be applied to other rotary machines than that herein described by way of example and that same may be modified without departing from the scope of my invention as defined by the following claims.

I claim:

1. In a rotary engine, the combination of a cylindrical stator, a shaft in said stator coaxial therewith, a rotor arranged eccentrically in said stator, cylindrical bearings arranged to oscillate in said rotor, blades in said rotor slidably engaging said bearings, each of said blades being mounted on said shaft parallel to but laterally offset with respect to a radius of said cylindrical stator.

2. In a rotary engine, the combination of a cylindrical stator, a shaft in said stator coaxial therewith, a rotor arranged eccentrically in said stator, cylindrical bearings arranged to oscillate in said rotor, blades mounted on said shaft, said blades having their longitudinal axial planes equidistant from the axis of said shaft and extending each through one of said bearings, said blades slidably engaging their respective bearings.

3. In a rotary engine, the combination of a cylindrical stator, a shaft in said stator coaxial therewith, a rotor mounted eccentrically in said stator, bearings arranged to oscillate in said rotor, blades mounted on said shaft and extending each through one of said bearings, each of said blades having a bore adapted to engage said shaft, the axial longitudinal planes of said blades being each spaced from the axis of said bores by a distance at least equal to half the distance between the respective axes of said stator and rotor.

4. In a rotary engine, the combination of a cylindrical stator, a shaft coaxial with said stator, a rotor arranged eccentrically in said stator, bearings arranged to oscillate in recesses in said rotor, blades in said rotor slidably engaging each one of said bearings, each of said blades having a bore engaging said shaft, the axial longitudinal planes of said blades being tangential to said bores.

5. In a rotary engine, the combination of a cylindrical stator, an eccentric rotor in said stator, a shaft coaxial with said stator, blades on said shaft extending across said rotor to said cylindrical stator, said blades being laterally offset with respect to radii of said cylindrical stator, cylindrical recesses in said rotor, cylindrical bearings in said recesses, said recesses being unsymmetrical with respect to planes passing through the center of said rotor and the respective centers of said bearings, said blades slidably engaging each one of said bearings.

6. In a rotary engine, the combination of a cylindrical stator, a shaft in said stator coaxial therewith, an eccentric rotor in said stator, cylindrical bearings in said rotor, blades mounted on said shaft and extending through and slidably engaging said bearings, said blades having each a bore adapted to engage said shaft, the axis of said bores being equally spaced from the longitudinal axial plane of each of said blades, said bearings being arranged to oscillate in cylindrical recesses in said rotor, said recesses being unsymmetrical with respect to planes passing through the axis of said rotor and the respective axes of said bearings, the arrangement being such that the oscillations of said bearings are smaller in one half of a revolution than in the other half, the working zone of the engine being comprised in the half revolution where said oscillations are smaller.

RAOUL MABILLE.